(12) United States Patent
Chiou et al.

(10) Patent No.: US 9,127,107 B2
(45) Date of Patent: Sep. 8, 2015

(54) AQUEOUS AMPHIPHILIC COPOLYMER EMULSIONS HAVING CONTROLLED VISCOSITY AND METHODS FOR MAKING THE SAME

(75) Inventors: Shang-Jaw Chiou, Lower Gwynedd, PA (US); Ari K. Kar, Warrington, PA (US); Robert F. Dougherty, Hatboro, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1377 days.

(21) Appl. No.: 11/894,436

(22) Filed: Aug. 21, 2007

(65) Prior Publication Data

US 2008/0058456 A1  Mar. 6, 2008

Related U.S. Application Data

(60) Provisional application No. 60/841,349, filed on Aug. 31, 2006.

(51) Int. Cl.
| | | |
|---|---|---|
| *C08F 2/38* | (2006.01) | |
| *C08F 220/18* | (2006.01) | |
| *C08F 2/22* | (2006.01) | |
| *C08F 4/40* | (2006.01) | |
| *C08F 220/06* | (2006.01) | |

(52) U.S. Cl.
CPC .............. *C08F 220/18* (2013.01); *C08F 2/22* (2013.01); *C08F 2/38* (2013.01); *C08F 4/40* (2013.01); *C08F 220/06* (2013.01)

(58) Field of Classification Search
CPC ................................ C08F 220/18; C08F 2/38
USPC .............................. 524/418, 609, 724; 526/85
See application file for complete search history.

(56) References Cited

U.S. PATENT DOCUMENTS

| | | | |
|---|---|---|---|
| 5,316,860 A | | 5/1994 | Stewart et al. |
| 5,354,800 A | * | 10/1994 | Suzuki et al. ................. 524/460 |
| 5,369,163 A | * | 11/1994 | Chiou et al. .................. 524/458 |
| 5,412,051 A | * | 5/1995 | McCallum et al. ......... 526/317.1 |
| 5,455,315 A | | 10/1995 | Paine et al. |
| 5,709,714 A | | 1/1998 | Natoli et al. |
| 5,760,129 A | * | 6/1998 | Lau ................................ 524/732 |
| 5,789,511 A | * | 8/1998 | Kimpton et al. ............ 526/318.6 |
| 6,063,857 A | * | 5/2000 | Greenblatt et al. ........... 524/561 |
| 6,780,918 B2 | | 8/2004 | Brizzolara |
| 6,869,996 B1 | | 3/2005 | Krajnik et al. |
| 7,019,072 B2 | * | 3/2006 | Choi et al. ...................... 524/801 |
| 2003/0162679 A1 | * | 8/2003 | Rodrigues et al. ............ 510/296 |
| 2003/0180469 A1 | | 9/2003 | El A'mma et al. |
| 2005/0119146 A1 | | 6/2005 | Rodrigues |
| 2005/0203218 A1 | | 9/2005 | Kuo et al. |
| 2005/0221107 A1 | | 10/2005 | Miyai et al. |
| 2006/0094636 A1 | * | 5/2006 | Rodrigues ..................... 510/476 |
| 2007/0043156 A1 | * | 2/2007 | Mestach et al. ............... 524/457 |

FOREIGN PATENT DOCUMENTS

| | | |
|---|---|---|
| EP | 0 597 567 A2 | 5/1994 |
| EP | 0 757 108 B1 | 9/1999 |
| EP | 1 652 825 A2 | 5/2006 |
| EP | 1 652 825 A3 | 5/2006 |
| WO | WO 95/23829 | 9/1995 |

* cited by examiner

*Primary Examiner* — Mark Eashoo
*Assistant Examiner* — Michael A Salvitti
(74) *Attorney, Agent, or Firm* — Andrew E. C. Merriam

(57) ABSTRACT

The present invention provides aqueous amphiphilic emulsion copolymer compositions comprising one or more aqueous phase copolymer, a residue of one or more hydrophilic chain transfer agent, and a residue of one or more hydrophobic chain transfer agent, as well as methods of making such copolymers in water or an aqueous liquid by copolymerizing a monomer component of from 20 to 80 wt. %, based on the weight of the monomer component, of a hydrophilic group-containing monomer and the remainder of a copolymerizable ethylenically unsaturated monomer or prepolymer in the presence of a mixed chain transfer agent component comprising a hydrophilic chain transfer agent, such as 3-mercaptopropionic acid, and a hydrophobic chain transfer agent, such as N-dodecyl mercaptan. The aqueous amphiphilic emulsion copolymers of the present invention are storage stable and exhibit excellent viscosity control even in high solids compositions, e.g. from 50 to 80 wt. % of the composition. The high solids compositions can be diluted at the point of use, thus reducing shipment costs.

11 Claims, No Drawings

AQUEOUS AMPHIPHILIC COPOLYMER EMULSIONS HAVING CONTROLLED VISCOSITY AND METHODS FOR MAKING THE SAME

This is a non-provisional application of prior pending U.S. provisional Application Ser. No. 60/841,349 filed on Aug. 31, 2006.

The present invention relates to low viscosity, high solids amphiphilic aqueous emulsion copolymers and to methods for making the same using a mixed chain transfer agent component. More particularly, the present invention relates to amphiphilic aqueous emulsion copolymers having one or more aqueous phase copolymer and comprising a residue of one or more hydrophilic chain transfer agent and a residue of one or more hydrophobic chain transfer agent, as well as to methods for making the same.

Known amphiphilic copolymer latices may contain amounts of polymerized hydrophilic monomer above 10 wt. %, based on the weight of monomers used to make the copolymer. Such amphiphilic copolymer latices can exhibit uncontrolled or excessive viscosity problems, during or following polymerization in aqueous media, making them difficult if not impossible to handle. The polymerization of amphiphilic polymers poses additional difficulties. For instance, ahydrophobic chain transfer agent will tend not to mix well with hydrophilic monomers. The result is poor control of polymerization kinetics, low conversion, and ineffective control of the molecular weight of growing polymer chains within the aqueous phase. Loss of molecular weight control can lead to loss of performance properties, to high quality control costs and/or safety issues.

In the past, manufacturers of amphiphilic copolymers have resorted to solution or co-solvent polymerization to make low solids copolymers to avoid problems with excessive or uncontrolled viscosity. Solution or co-solvent polymerization results in random copolymers which lack the performance properties needed to enable their use in applications, for example, as thickeners and compatibilizers, or in compositions for personal care, e.g. hair conditioner. In addition, each of solution and co-solvent polymerization requires the use of volatile organic compounds (VOC's) in amounts which are undesirable from an environmental, health and safety standpoint, and which use may be prohibited in many countries. Still further, such low solids polymers contain a lot of liquid, are expensive to ship and store, and must be dried before or in use.

U.S. Pat. No. 6,869,996 B1, to Krajnik et al., discloses aqueous copolymers having post-crosslinking groups, a subgenus of which are disclosed for use as dispersants, and a subgenus of which are disclosed for use as associative thickeners. However, the copolymers disclosed therein lack a sufficiently hydrophobic chain or segment to give desirable thickening, dispersing or waterproofing properties without incorporation of an expensive hydrophobic group-containing macromonomer. Accordingly, the copolymers themselves are complex and have an unpredictable morphology; and, further, the methods used to make such copolymers are complex and expensive, and include pre-polymerization to make a macromonomer, e.g. from an isocyanate and polyol component. In addition, the macromonomers shown in the examples of Krajnik et al. comprise alkoxylated alkylphenols, such as ethoxylated nonylphenols, that are known or suspected carcinogens and pose other environmental, health and regulatory concerns.

Accordingly, the present inventors have sought to solve the problem of providing a storage stable, aqueous amphiphilic copolymer having a controlled viscosity, a high solids content, a high proportion of hydrophilic groups, and a defined hydrophobic chain or segment.

SUMMARY OF THE INVENTION

According to the present invention, aqueous amphiphilic emulsion copolymers compositions comprise an aqueous liquid and a copolymer having one or more aqueous phase copolymer and one or more disperse phase copolymer, a residue of one or more hydrophilic chain transfer agent, and a residue of one or more hydrophobic chain transfer agent, the copolymer comprising the reaction product of a monomer component of (i) from 20 to 80 wt. % of one or more hydrophilic group-containing monomer chosen from ethylenically unsaturated carboxylic acid, (meth)acrylamide, amine-functional (meth)acrylates, hydroxyalkyl (meth)acrylate, phosphorus-containing acid functional (meth)acrylate, (poly)alkoxylated (meth)acrylate, sulfonic acid functional (meth)acrylate, (meth)acrylamide methylpropane sulfonate, alkyl vinyl ether, vinyl phosphonate, vinyl sulfonate, vinyl pyrrolidone, vinyl caprolactam, vinyl amine and vinylimidazole, and (ii) from greater than 20 to 80 wt. % of one or more copolymerizable ethylenically unsaturated monomer chosen from $C_3$ to $C_7$ (cyclo)alkyl (meth)acrylate, $C_8$ to $C_{30}$ (cyclo)alkyl (meth)acrylate, vinyl ester, vinyl group containing olefin prepolymer, monoalkyl (meth)acrylamide, N,N-dialkyl (meth)acrylamide, styrene, and α-methyl styrene, all monomer amounts based on the total weight of the monomer component, wherein, when the one or more copolymerizable ethylenically unsaturated monomer is a $C_8$ to $C_{30}$ alkyl (meth)acrylate, the proportion of such monomer ranges from greater than 50 wt. % up to and including 80 wt. %, based on the total weight of the monomer component, and further, wherein, when the copolymerizable ethylenically unsaturated monomer is a cycloalkyl (meth)acrylate, the proportion of the one or more hydrophilic group-containing monomer is 25 wt. % or more, based on the total weight of the monomer component.

Acrylic acid is the preferred hydrophilic group-containing monomer. Preferably, the copolymerizable ethylenically unsaturated monomer is chosen from butyl acrylate, ethylhexyl (meth)acrylate, lauryl (meth)acrylate, isobornyl (meth)acrylate, cetyleicosyl methacrylate, mixtures of any of these with styrene, or mixtures of any of these with α-methyl styrene.

The aqueous amphiphilic emulsion copolymer compositions may further comprise one or more macromolecular organic compound having a hydrophobic cavity, such as cyclodextrin.

In addition, according to the present invention, methods for making low viscosity, high solids amphiphilic emulsion copolymers comprise
providing an aqueous liquid,
providing the monomer component of (i) and (ii), wherein, when the one or more copolymerizable ethylenically unsaturated monomer comprises a $C_8$ to $C_{30}$ alkyl (meth)acrylate, the proportion of such monomer ranges from greater than 50 wt. % up to and including 80 wt. %, based on the total weight of the monomer component, and further, wherein, when the copolymerizable ethylenically unsaturated monomer is a cycloalkyl (meth)acrylate, the proportion of the one or more hydrophilic group-containing monomer is 25 wt. % or more, based on the total weight of the monomer component;
providing a mixed chain transfer agent component which comprises one or more hydrophobic chain transfer agent and one or more hydrophilic chain transfer agent, providing a catalyst or initiator component,
providing a surfactant or emulsifier component,
combining the said components to form a reaction mixture whereby the said catalyst or initiator component and the said hydrophilic chain transfer agent do not contact each other until copolymerization begins, and
aqueous emulsion copolymerizing the reaction mixture to form an emulsion copolymer comprising one or more aqueous phase copolymer.

Preferably, combining the components comprises feeding independently into the aqueous liquid the mixed chain transfer agent component, and the catalyst or initiator component during the combining of the components to form a reaction mixture. Each component may comprise a pre-dispersion comprising the component itself, e.g. the mixed chain transfer agent component, a portion of the aqueous liquid, and a surfactant or emulsifier component.

The copolymerizable ethylenically unsaturated monomer may be complexed with one or more macromolecular organic compound having a hydrophobic cavity, such as cyclodextrin.

Preferably, emulsion copolymerizing comprises shot copolymerizing the monomer component to make a linear copolymer.

All ranges recited are inclusive and combinable. For example, an average particle size of 1.3 µm or more, for example, 1.5 µm or more, which may be 4.5 µm or less, or 4.0 µm or less, will include ranges of 1.3 µm or more to 4.5 µm or less, 1.5 µm or more to 4.5 µm or less, 1.5 µm or more to 4.3 µm or less, and 1.3 µm or more to 4.3 µm or less.

Unless otherwise indicated, all temperature and pressure units are standard temperature and pressure (STP).

All phrases comprising parentheses denote either or both of the included parenthetical matter and its absence. For example, the phrase "(meth)acrylate" includes, in the alternative, acrylate and methacrylate.

As used herein, the term "aqueous liquid" means water or an aqueous solvent mixture containing water and water-miscible solvent in which the amount of water-miscible solvent is 5 wt. % or less, based on the total weight of the aqueous solvent mixture.

As used herein, unless otherwise indicated, the term "average particle size" means the particle size as determined by light scattering using a, BI-90 Plus instrument from the Brookfield Instrument Company, Middleboro, Mass.

As used herein, the term "component" means a composition comprising the specified ingredient. For example, an initiator component may simply be an initiator or it may comprise an initiator pre-dispersion of initiator, aqueous liquid and emulsifier or surfactant.

As used herein, the term "feeding independently" includes feeding each component at its own feed rate into an inlet stream or into a reaction vessel, upstream of, at the same point of or downstream of the inlet feed of another component, and starting at the same time or at a different time.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "molecular weight" refers to the weight average molecular weight as measured by gel permeation chromatography (GPC) against a polyacrylic acid (PAA) standard of a copolymer that is hydrolyzed in KOH.

As used herein, the glass transition temperature ($T_g$) of any polymer may be calculated as described by Fox in *Bull. Amer. Physics. Soc.*, 1, 3, page 123 (1956). The Tg can also be measured experimentally using differential scanning calorimetry (rate of heating 20° C. per minute, Tg taken at the midpoint of the inflection or peak). Unless otherwise indicated, the stated Tg as used herein refers to the calculated Tg.

As used herein, the phrase "wt. %" stands for weight percent.

The methods of the present invention are carried out in aqueous liquid to provide amphiphilic block or segmented copolymers. The methods of the present invention can be used to provide storage stable amphiphilic copolymers, especially in applications wherein the compositions have a "high solids" content of from 30 to 85 wt. %, for example, 50 wt. % or more. Such compositions may be shipped as concentrates and diluted at the point of use. Further, the methods of the present invention enable controlled aqueous copolymerization of hydrophilic monomers and monomers having a very low solubility in water, such as a $C_8$ to $C_{30}$ (cyclo)alkyl (meth) acrylate.

The resulting amphiphilic emulsion copolymers comprise one or more aqueous phase copolymer and one or more disperse phase copolymer wherein the proportion of the hydrophilic portion of the copolymers varies from phase to phase, i.e. from the disperse phase to the aqueous phase. When 20 wt. % or more of polymerized hydrophilic monomer residues are present in the copolymer, the copolymerization product comprises at least one copolymer in the aqueous phase as well as at least one copolymer in the disperse phase. For example, the emulsion copolymers of the present invention may comprise a distribution of copolymers having a gradient hydrophilic group concentration, the gradient ranging from copolymers comprising very little of the polymerization product of hydrophobic monomers in the aqueous phase to copolymers comprising very little of the polymerization product of hydrophilic monomers in the disperse phase. The mixture thus obtained may be self-compatibilizing and/or self-dispersing. The viscosity of the product emulsion copolymer is surprisingly low in high solids compositions, and the copolymer emulsion composition is surprisingly storage stable.

The reaction mixture comprises water, one or more hydrophilic group-containing monomer, one or more ethylenically unsaturated monomer, one or more hydrophobic chain transfer agent, one or more hydrophilic chain transfer agent, one or more emulsifier or surfactant, and one or more initiator or catalyst.

The reaction mixture comprises less than 5 wt. % of any organic solvent, based on the total weight of water and solvent. Preferably, the reaction medium consists essentially of water. If more than 5 wt. % of organic solvent is included in the aqueous liquid, only inadequate partitioning of the continuous (hydrophilic) phase and the disperse phase will result, thereby yielding copolymers having an unstable viscosity, inadequate storage stability, or lacking a well defined block or segment morphology. Retention of a well resolved emulsion phase partition enables the formation of the characteristic gradient hydrophilic group concentration of the inventive copolymers. Further, retention of such a phase partition enables the viscosity control observed in the instant invention.

According to the present invention, very hydrophilic monomers provide the best emulsion phase partition and yield the most stable, well defined hydrophilic polymeric block or segment.

One or more hydrophilic group-containing monomer may be chosen from (meth)acrylic acid, ethylenically unsaturated carboxylic acid, such as maleic acid or anhydride or itaconic acid, (meth)acrylamide, monoalkyl (meth)acrylamide, N,N-dialkyl (meth)acrylamide, amine-functional (meth)acrylate, such as aminopropyl methacrylate and dimethylamino ethyl methacrylate, hydroxyalkyl (meth)acrylate, such as hydroxyethyl methacrylate, phosphorus-containing acid functional (meth)acrylate, (poly)alkoxylated (meth)acrylate, sulfonic acid functional (meth)acrylate, (meth)acrylamide methylpropane sulfonate, alkyl vinyl ether, vinyl phoshponate, vinyl sulfonate, vinyl pyrrolidone, vinyl caprolactam, vinyl amine and vinylimidazole. Preferably, the hydrophilic group-containing monomer is acrylic acid, hydroxyalkyl (meth)acrylate, amine-functional (meth)acrylate, or mixtures thereof. More preferably, hydrophilic group-containing monomer is a single monomer chosen from acrylic acid, hydroxyalkyl (meth)acrylate, and amine-functional (meth)acrylate, Amounts of the one or more hydrophilic group-containing monomer may range 20 wt. % or more, based on the total weight of the monomer component, preferably, greater than 20 wt. %, or 25 wt. % or more, and may range up to 80 wt. % of all monomers, or up to 65 wt. %, preferably up to 50 wt. %, or, more preferably, up to 40 wt. %.

Copolymerizable ethylenically unsaturated monomers may be chosen from one or more $C_3$ to $C_7$ (cyclo)alkyl (meth) acrylate, $C_8$ to $C_{30}$ (cyclo)alkyl (meth)acrylate, vinyl ester, vinyl group containing olefin prepolymer, such as ethylene-styrene prepolymers, monoalkyl (meth)acrylamide, such as $C_6$ to $C_{30}$ alkyl (meth)acrylamide, N,N-dialkyl (meth)acrylamide, styrene, and α-methyl styrene, and a mixture thereof. Preferably, the copolymerizable ethylenically unsaturated monomer may be chosen from chosen from butyl (meth) acrylate, ethylhexyl (meth)acrylate, cetyl (meth)acrylate, eicosyl (meth)acrylate, lauryl (meth)acrylate, stearyl (meth) acrylate, isobornyl(meth)acrylate, styrene, and any mixture thereof. To provide desirable water-resistance and softness properties, when $C_8$ to $C_{30}$ (cyclo)alkyl (meth)acrylates are used, they are preferably used in amounts exceeding 50 wt. % of all monomers used to make the copolymer. A preferred mixture of the copolymerizable ethylenically unsaturated monomer is cetyl-eicosyl methacrylate, which preferably comprises a mixture of 48-55 wt. % of $C_{16}$ alkyl methacrylate, 26 to 35 wt. % of $C_{18}$ alkyl methacrylate, and 9 to 12 wt. % of $C_{20}$ alkyl methacrylate.

Up to 5 wt. % of methyl methacrylate or ethyl methacrylate may be added, based on the total weight of the monomer component.

Crosslinking monomers may but need not be used. Preferably, crosslinkers are used in amounts of up to 5 wt. %, based on the total weight of the monomer component. Suitable crosslinkers may include divinyl benzene, allyl methacrylate, methylene bisacrylamide, and glycol di(meth)acrylates.

Illustrative of substantially hydrophilic chain transfer agents are alkyl mercaptans, mercaptoalkanols and alkyl or aryl mercaptocarboxylic acids, such as methyl mercaptan, ethyl mercaptan, n-butyl mercaptan, t-butyl mercaptan, mercaptoacetic acid, mercaptoethanol, mercaptopropanol, mercaptobutanol, 3-mercaptol-1,2-propanediol, 2- methyl-2-propanethiol, 1-thioglycerol, mercaptoacetic acid, methyl 3-mercaptopropionate (MMP), mercaptopropionic acid, thioglycolic acid, thiomalic acid, thiomalonic acid, thioadipic acid, 2-mercaptoethanesulfonic acid; halides, such as bromoform and chloroform, lower oxoacids and salts thereof, such as phosphorous acid, hypophosphorous acid and salts thereof, like sodium hypophosphite or potassium hypophosphite, sulfurous acid, hydrogen sulfite, dithionous acid, metabisulfurous acid and salts thereof, like sodium sulfite, sodium hydrogen sulfite, sodium dithionite, sodium metadisulfite, potassium sulfite, potassium hydrogen sulfite, sodium dithionite, and potassium metadisulfite; and mixtures thereof. Preferably, the hydrophilic chain transfer agent comprises 3-mercaptopropionic acid.

Illustrative of the substantially hydrophobic chain transfer agents include, for example, n-dodecyl mercaptan (n-DDM), t-dodecyl mercaptan (dodecanethiol), decyl mercaptan, octyl mercaptans, benzyl mercaptan, phenyl mercaptan, cyclohexyl mercaptan, pentaerythritol tetramercaptopropionate, hexadecyl mercaptan, octyldecyl mercaptan, tetradecyl mercaptan, n-butyl 3-mercaptopropionate (BMP) and 2-ethylhexyl-3-mercaptopropionate; halides such as tetrachlorocarbon, tetrabromocarbon, methylene chloride and bromotrichloroethane; and mixtures thereof.

Preferably, the hydrophobic chain transfer agent comprises n-DDM.

Suitable amounts of hydrophilic chain transfer agent may range from 0.05 to 1.75 wt. %, based on the total weight of the reaction mixture, preferably 0.15 wt. % or more, or, more preferably, 0.25 wt. % or more. Amounts may preferably range as high as 0.6 wt. %, or, more preferably, up to 0.6 wt. %. Use of more than 1.75 wt. % hydrophilic chain transfer agent, based on the total weight of the reaction mixture, can interfere with reaction kinetics, for example, the hydrophilic chain transfer agent can react with the initiator. Use of less than the 0.05 wt. % of a hydrophilic chain transfer agent will result in poor molecular weight control of the aqueous phase (co)polymer, in turn resulting in polymers having high in-process and/or final viscosity, and performance deficiencies.

Total amounts of chain transfer agent may range from 1.0 to 10.0 wt. %, based on the total weight of the reaction mixture, preferably, 3.0 wt. % or more, or, more preferably, 4.0 wt. % or more. Amounts may preferably range as high as 6.0 wt. %, or, more preferably, up to 5.0 wt. %. Use of more than 20 9.95 wt. % of hydrophobic chain transfer agent can cause conversion problems, high unreacted monomer levels, performance problems, and odor problems.

Initiators and catalysts useful in the methods of the present invention may comprise known thermal and redox polymerization initiators and catalysts. Preferably, catalysts comprise a water soluble redox pair, such as persulfates, for example, ammonium persulfate and sodium bisulfite. For copolymerization vinyl group, e.g. styrene, containing olefin prepolymers as the copolymerizable ethylenically unsaturated monomer, suitable catalysts may comprise an aluminum activator mixed with a metallic catalyst comprising a metal center, M selected from Ni and Pd, complexed with at least one ligand, wherein the at least one ligand has a structure according to the following formula:

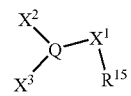

wherein, $X^1$, $X^2$ and $X^3$ are independently selected from a hydrocarbyl group, an aromatic hydrocarbyl group and derivatives thereof; further, wherein Q is selected from phosphorus, arsenic, nitrogen and antimony; still further, wherein $R^{15}$ is selected from $—SO_3$, $—SO_2N(R^{18})$, $—CO_2$, $—PO_3$, $—AsO_3$, $—SiO_2$, $—C(CF_3)_2O$; and, yet still further, wherein $R^{18}$ is selected from a hydrogen, a halogen, a hydrocarbyl group, an aromatic hydrocarbyl group and a substituted hydrocarbyl group. Preferably, $X^1$, $X^2$ and $X^3$ are aromatic hydrocarbyl groups and derivatives thereof, such as benzyl, phenyl and anisole; more preferably, $X^1$, $X^2$ and $X^3$ are aromatic hydrocarbyl groups and derivatives thereof and $R^{15}$ is selected from $—SO_3$ and $—SO_2N(R^{18})$. Olefin and vinyl monomers are copolymerized in solvent to make a vinyl group containing olefin prepolymer, followed by removal of the solvent prior to incorporation into the aqueous emulsion reaction mixture.

Catalyst promoters may be used to expedite reaction rates. Suitable promoters may comprise transition metals or transition metal salts, such as iron sulfate. Promoters are typically used in ppm quantities, but may be used in amounts of 0.01 wt. % or more, and up to 1.0 wt. %, or up to 0.2 wt. %, or up to 0.1 wt. %, all weight percentages based on the total weight of the monomer component.

The surfactant or emulsifier component helps confer stability to the aqueous reaction mixture, any component thereof, and the product emulsion copolymer. Suitable surfactants or emulsifiers may comprise one or more cationic, anionic or non-ionic surfactants or emulsifiers, preferably anionic surfactants or emulsifiers, more preferably, sodium lauryl sulfate, sodium dodecylbenzene sulfonate, fatty alcohol ethers, fatty alcohol ether sulfates, and polyether sulfosuccinates. Suitable amounts of the surfactant or emulsifier component may range from 0.1 wt. % or higher and up to 6 wt. %, preferably, from 1 to 2 wt. %, all percentages based on the total weight of the monomer component. The emulsion copolymers of this invention may also be surface active and self-dispersing, such that they may be polymerized via aqueous polymerization without emulsifiers or surfactants in the presence of shear.

One or more of cyclodextrin, a cyclodextrin derivative, cycloinulohexose, cycloinuloheptose, cycloinuloctose, calyxarene and cavitand may be used to form a complex with the copolymerizable ethylenically unsaturated monomer, or CTA, thereby aiding in the transfer of hydrophobic monomer or CTA, e.g. lauryl methacrylate, cetyl methacrylate or n-dodecylmercaptan, into the aqueous emulsion during polymerization and enhancing viscosity control in the aqueous copolymer emulsions. Cyclodextrins are preferred. Suitable cyclodextrins may comprise methyl-α-cyclodextrin, α cyclodextrin, β cyclodextrin, γ cyclodextrin, ethoxylated cyclodextrin, propoxylated cyclodextrin, methyl-β cyclodextrin, methyl-gamma cyclodextrin, and mixtures thereof. Suitable amounts of the cyclodextrin may range up to 10 wt. %, or up to 5 wt. %, or 0.1 wt. % or more, preferably, up to 4 wt. %, or, preferably, 0.5 wt. % or more, all wt. percentages being based on the total weight of the amphiphilic copolymer.

In the methods of the present invention, the proportion of the mixed chain transfer agent component, the monomer component and the catalyst or initiator component remains balanced throughout polymerization. The reaction mixture may be formed by combining any ingredients in any order, so long as the hydrophilic chain transfer agent component and catalyst or initiator component do not contact each other until copolymerization begins, e.g. in the reactor. Hydrophilic chain transfer agents, may, under certain conditions, and especially at levels above 0.1 wt. %, based on the weight of all components of the reaction mixture, react with and deplete initiators, such as ammonium persulfate. The result is poor control of polymerization kinetics, low conversion, and ineffective control of the molecular weight of growing polymer chains within an emulsion particle. Loss of molecular weight control can lead to loss of performance properties. Accordingly, the hydrophilic chain transfer agent should not come into contact with the catalyst or initiator prior to being added to the reactor. For example, the hydrophilic chain transfer agent component and catalyst or initiator component can be introduced via separate feeds into the reactor, or one or them but not the other may be incorporated into the dispersed phase of an emulsion, e.g. via pre-dispersion with one or more monomer; the reaction mixture components except one of the catalyst or initiator component or the hydrophilic chain transfer agent component may be dispersed together at once, and the catalyst or initiator component or hydrophilic chain transfer agent component can be fed thereto; each of the monomer component, the catalyst or initiator component or the mixed chain transfer agent component may be dispersed in aqueous surfactant or emulsifier to form, respectively, a monomer component pre-dispersion, an initiator component pre-dispersion and a mixed chain transfer agent pre-dispersion, and any or all of the pre-dispersions may be mixed or dispersed together in any order in the reaction vessel or in an inlet thereto.

In other embodiments of the copolymerization methods, combining the components comprises feeding independently into a reactor each of the monomer component, the mixed chain transfer agent component, the catalyst or initiator component, and the surfactant or emulsifier component, and mixing to form a reaction mixture. Alternatively, an aqueous mixed chain transfer agent component pre-dispersion can be fed independently into the reaction mixture in an inlet stream at or just upstream of an in-line mixing device, or in a reaction vessel.

In another simpler embodiment, all components of the aqueous reaction mixture except the mixed chain transfer agent component are combined, followed by feeding thereto in a reaction vessel the remaining mixed chain transfer agent component.

In one embodiment for controlling emulsion copolymer particle size, up to 20 wt. %, preferably up to 10 wt. %, of the total.amount of surfactant or emulsifier component used is added with water to the reaction vessel before feeding in any components.

To maximize copolymerization efficiency and yield, aqueous surfactant is charged to the reaction vessel, followed by starting a feed of the catalyst or initiator component thereto, and then, after from 1 to 10 minutes, a single feed of the reaction mixture, i.e. mixed chain transfer agent component, surfactant or emulsifier component, and monomer component, is dispersed in-line and added to a reaction vessel begin copolymerization. Preferably, catalyst promoter salt and an acid, e.g. iron and acetic acid, is added to the reaction vessel containing aqueous surfactant or emulsifier component, followed by to starting a feed of initiator or redox catalyst, monomer and mixed chain transfer agent components, and any remaining surfactant or emulsifier to the reaction vessel.

Suitable feeding devices may comprise any inlet stream having an in-line mixing device, such as an in-line emulsifier, in-line sonicator, in-line homogenizer, mixing tee, in-line static mixer, and a combination of any of these. Further, suitable feeding devices may comprise any inlet directly to a mixing vessel, i.e. one equipped with a mixing device, such as an emulsifier, sonicator, homogenizer, impeller, and any combination thereof. The mixing vessel may have a feed leading into a suitable reaction locus, kettle or vessel, or the mixing vessel may comprise the reaction vessel itself. Mixing the components of the reaction mixture, excluding one of the initiator or catalyst or the mixed chain transfer agent component in an in-line mixer, sonicator, emulsifier or homogenizer, and feeding in the remaining component in the reactor is preferred.

Useful methods of aqueous emulsion polymerization include either addition polymerization or olefin polymerization in the presence of both the hydrophilic chain transfer agent and the hydrophobic chain transfer agent, preferably, addition polymerization. Gradual addition polymerization is the preferred method. Shot polymerization may be used to generate more linear copolymers. Monomers may also be added in two or more stages to create multi-staged polymers.

The aqueous amphiphilic emulsion copolymers may comprise two stage or multi-stage copolymers, such as core-shell or multilobal polymers. Such polymers may be made by feeding in the copolymerizable ethylenically unsaturated monomer and the hydrophilic group-containing monomer at various rates and times during copolymerization. For example, telechelic polymers having blocks or segments may be made by feeding in hydrophilic group-containing monomer, e.g. acid monomer, to form aqueous phase acid rich (co)polymer (A), followed by feeding in and copolymerizing hydrophobe rich monomer (B) to form an A-B segmented copolymer, which can be reacted with another similar A-B copolymer to give A-B-A or B-A-B copolymers useful as associative thickeners.

The reaction vessel is not critical so long as it can withstand the copolymerization conditions of the present invention. Corrosion resistant materials such as glass, glass lined materials or stainless steel may be used. Suitable reaction loci may include reactors or kettles, or continuous polymerization apparati, such as tubular vessels, and vessels contained in heat exchangers.

Polymerization reaction temperatures and pressures are not critical and may be determined by the ordinary skilled artisan depending upon the monomer component chosen. Exemplary reaction temperatures range from 35 to 95° C., for example, 75° C. or higher. The copolymerization reaction times may range from 1 to 24 hours or more, preferably, 6 hours or less or, more preferably, from 2 to 4 hours.

Copolymerization should be conducted in the absence of oxygen to avoid catalyst consumption, radical quenching etc., preferably in a nitrogen gas atmosphere and/or a partial vacuum During copolymerization of acidic hydrophilic group-containing monomers, the copolymeric chains are preferably not neutralized. In process neutralization of the copolymers may lead to uncontrolled viscosity, performance drawbacks or may impair storage stability. However, the copolymers may be neutralized after polymerization or immediately prior to use, such that, for example, up to 40% of the acid groups on the copolymer are neutralized.

Suitable molecular weights of the amphiphilic emulsion copolymer of the present invention are 2,000 or higher, or 5,000 or higher and up to 1,000,000 or more, preferably, 200,000 or less, more preferably, 60,000 or less. Suitable copolymer molecular weights range from 10,000 or more, 15,000 or more, and, preferably, 30,000 or more.

Solids contents of the aqueous amphiphilic emulsion copolymer polymerization product may range from 20 wt. %, based on the total weight of the compositions, to 85 wt. %, and, preferably, 30 wt. % or more, or, more preferably, 50 wt. % or more. To help control the viscosity of the aqueous amphiphilic emulsion copolymers, especially where solids contents are above 50 wt. %, such copolymers are preferably not neutralized. Where applications call for neutralization, such copolymers. Alternatively, the product can be dried to a powder form, for example, by spray drying may be neutralized after polymerization or immediately prior to use.

The amphiphilic emulsion copolymers of the present invention may be used as thickeners, rheology modifiers, dispersants, lubricants, compatibilizers; stabilizers; binders, adhesives and film-formers in various uses.

Thickeners find use in latex coatings, drilling muds and cosmetics. For example, latex coatings useful as quick drying coatings can comprise one or more latex binder chosen from acrylic, styrene or vinyl, e.g. vinyl acetate or vinylamine, and up to 10%, by volume, of one or more thickener made from the amphiphilic emulsion copolymers of the present invention.

As thickeners and rheology modifiers, the aqueous amphiphilic emulsion copolymers may comprise encapsulated alkali swellable polymer dispersions (EASPs), and associative thickeners chosen from hydrophobically-modified alkali-soluble (or swellable) emulsions (HASE) and polyacrylamides. Preferably, the thickeners comprise B-(A-B)$_n$ triblock or polyblock copolymers, wherein B represents a hydrophobic block or segment and A represents a hydrophilic block or segment, and n is an integer of from 1 to 500.

EASPs comprise a swellable acid core polymerized from one or more acid hydrophilic group-containing monomer and, sequentially, one or more subsequent emulsion polymerized nonionic copolymerizable ethylenically unsaturated monomer stage to form a sheath polymer sheath polymer having a Tg of 50° C. or below on the acid core particles, wherein the acid core is swollen when the particles are subjected to an aqueous basic swellant sheath polymer.

HASE polymers and comprise the copolymerization product of from 20 to 60 wt. % of at least one monoethylenically unsaturated carboxylic acid as the hydrophilic group-containing monomer, from 1 to 30 wt. % of at least one (meth)acrylic acid ester of a (poly)alkoxylated $C_8$ to $C_{30}$ alkyl, alkylaryl or polycyclic alkyl group or complex hydrophobe (branched) alcohol or a complex hydrophobe containing poly(alkylenoxide) branches capped with hydrophobic alkyl or alkylaryl groups, and the remainder of a copolymerizable ethylenically unsaturated monomer, preferably a $C_3$ to $C_4$ alkyl (meth) acrylate, optionally with up to 1 wt. % of a crosslinking monomer, all monomer percentages based on the total weight of the monomer component. Suitable HASE polymers have a molecular weight of up to 2,500,000. The acidic portions of the HASE polymer may be neutralized with amine or alkali. In use, the HASE polymers may be mixed with surfactants.

Polyacrylamide thickeners comprise the copolymer reaction product of, by weight, at least 50% acrylamide, 0.01 to 50%, a $C_6$ to $C_{30}$ alkyl N-substituted acrylamide and, optionally up to 49.99% other hydrophilic vinyl monomers, especially, hydroxypropyl acrylate, hydroxyethyl methacrylate, hydroxyethyl acrylate, methacrylic acid, acrylic acid, and especially, N-vinylpyrrolidone.

As compatibilizers and stabilizers, the aqueous amphiphilic emulsion copolymers may stabilize or compatibilize polymer blends or compositions containing two or more polymers wherein one polymer is hydrophilic and the other is hydrophobic. In such uses, up to 20 wt. % aqueous amphiphilic emulsion copolymers may be added, based on the total weight of (co)polymers, preferably up to 10 wt. %.

As household cleaners, such as liquid and solid laundry detergents, aqueous amphiphilic emulsion copolymers may comprise the active ingredient. For example, a suitable copolymer comprises the copolymerization reaction product of a monomer component comprising from 20 to 40 wt. % or more of an acid or amine functional hydrophilic monomer, from 20 to 60 wt. % of a (poly)alkoxylated (meth)acrylate monomer, and 35 to 65 wt. % of one or more hydrophobic comonomer, such as a $C_3$ to $C_4$ alkyl (meth)acrylate.

The aqueous amphiphilic emulsion copolymers may act as surface active polymeric emulsifiers, provide formulation compatibility in hydrophobic or hydrophilic solvent systems, and can provide unique surface treatment properties with no build-up on the skin and hair surface. For example, the emulsion copolymers can act as emulsifiers in skin care lotions, moisturizers, creams, facial masks, color cosmetics, and body wash; and provide lasting hold in hair care products, such as shampoo and conditioners, hair styling products, hair spray, spray gel, styling gel, styling aids, hair pomade and hair wax. The aqueous amphiphilic emulsion copolymers have a gradient hydrophilic group concentration and are removable from skin and hair, can compatibilize bodily oils and water, and are non-toxic. One suitable hair fixative comprises, as copolymerized units, up to 50 wt. % of at least one $C_3$ to $C_8$ monoethylenically unsaturated monocarboxylic acid monomer, from 0 to 25 wt. % of at least one $C_4$ to $C_8$ monoethylenically unsaturated dicarboxylic acid monomer, such as maleic acid, up to 70 wt. % of a hydroxyalkyl (meth)acrylate, and from 5 to 80 wt. % of a $C_3$ to $C_{10}$ alkyl (meth)acrylate. The hair fixative may be neutralized. Another suitable hair fixative comprises a blend of block or segmented copolymers comprising one or more aqueous amphiphilic emulsion copolymer, wherein one of the copolymers has a Tg of from 40° C. to 150° C. and the other has a Tg from 0° C. to 35° C.

In addition the aqueous amphiphilic emulsion copolymers find use as coating binders and film formers, for example, in pavement or road marking traffic paints for concrete, asphalt or bituminous roads, walkways, or parking lots; metal protection coatings; mastics for roofs or other building components; and coatings for masonry, wood, plastics, woven and nonwoven fabrics and fibers, glass, leather, or paper. In one embodiment, such coating comprise quick drying coatings have a solids content in the range of from 50 percent to 85 wt. % of the composition. Such coatings may be quick drying paints comprising quick set binders and, optionally, further comprising, one or more thickener, and/or one or more absorber, such as an ion-exchange resin or a clay, in the range of from 0.01 to 90 wt. %, preferably up to 70 wt. %, more preferably, up to 30 wt. %, based on the total weight of the latex polymer in the paint.

In one embodiment, polyamine or pendant amine-functional aqueous amphiphilic emulsion copolymers having a Tg of −10° C. or higher may act as quick set binders for coatings. For example, such copolymers may be chosen from non-protonated or partially protonated polyamine functional polymer block or segment formed from an amine-containing hydrophilic group-containing monomer, such as a vinylamine or aminoalkyl (meth)acrylate, preferably a secondary or tertiary amino (meth)acrylate, and a block or segment formed from a copolymerizable ethylenically unsaturated monomer. The polyamine functional polymer may also comprise copolymerized hydrophilic group-containing monomers having pendant acid-functional groups, such as weak acid groups, such that the ratio of amine-functional groups to acid-functional groups is greater than about 3 to 1. Alternatively, quick set binders can comprise a blend of non-protonated or partially protonated polyamine functional aqueous amphiphilic emulsion copolymers and acid-functional aqueous amphiphilic emulsion copolymers, wherein the ratio of amine-functional groups to acid-functional groups is greater than about 3 to 1. A volatile base, such as ammonia or amine, is added in an amount sufficient to deprotonate the conjugate acid of the polyamine functional aqueous amphiphilic emulsion copolymer.

In another embodiment, a one-step retaining and fatliquoring treatment for tanned leather comprises an auxiliary tanning agent and an aqueous amphiphilic emulsion copolymer having a molecular weight of up to 120,000. In one example of the one-step retaining and fatliquoring treatment, the aqueous amphiphilic emulsion copolymers have, as repeat units, 60 wt. % of hydrophobic (meth)acrylates, such as butyl acrylate (BA), and 40 wt. % of a hydrophilic group-containing acid or basic monomer. The amount of copolymer used to treat the leather-is in the range of from 1 to 20 wt. % polymer solids on weight of leather, preferably from 2 to 15 wt. %, and most preferably from 3 to 12 wt. %. This treatment provides waterproofing and softness comparable to the properties of known treatments having 80 wt. % BA and less of the copolymerized hydrophilic group-containing monomer. Accordingly, the inventive acid containing aqueous amphiphilic emulsion copolymers bind more strongly to tanned leather, e.g. chrome tanned leather, and provide more fullness, plumpness and dye leveling to the leather than prior art polymers that provide coatings of comparable softness and waterproofing. Leather substrates treated may be used in automotive upholstery, garments, shoes, furniture, and gloves.

Compositions comprising the aqueous amphiphilic emulsion copolymers may further comprise various additives, such as extenders, pigments, opacifiers, matting agents, thickeners and rheology modifiers in paints and coatings; plasticizers, such as dimethicone and its copolyols, propellants, emulsifiers, such as phosphate ester emulsifiers; surfactants, such as PPG 28 Buteth 35, PEG 75 lanolin, water-miscible solvents, thickeners, colorants, fragrances, moisturizers, hair detangling aids, such as panthenol, antistatic aids, extracts, proteins, vitamins, dyes, tints, colorants, UV protectors, corrosion inhibitors, and antioxidants in cosmetics; retaining agents such as vegetable extracts, coloring agents such as dyes and pigments, other fatliquors, rheology modifiers, biocides, mildewcides, wetting agents, coalescents, rheology modifiers, fluorocarbons; plasticizers, silicone oils, surfactant stabilizing components, and fillers such as clay and proteins in leather filling and coating compositions. The ordinary skilled artisan in the relevant art can determine suitable amounts of such additives.

EXAMPLES

The test procedures used in the following Examples 1-4 are as follows:

Particle Size (PS): A dilute aqueous solution was prepared and tested on a "BI-90 plus" following manufacturers instructions.

pH: An ORION pH meter Model 230A (Thermo/Orion, Waltham, Mass.) fitted with a FISHER Accuphast Accuflow pH probe (Fisher, Newark, Del.) was calibrated using a two-point (pH=4 & 7) calibration method. Immediately following calibration, the pH was measured after the sample's temperature had equilibrated to approx. 20° C.

Solids: A sample weight of 0.5-1 grams was accurately weighed to four decimal places using a Mettler Model AE200 analytical balance (Mettler, Northbrook, Ill.). The samples were then placed in a 150° C. convection air oven for 1 hour. The samples were removed, cooled and immediately reweighed. The difference in weight compared to the initial sample weight represented the weight loss from water and other volatiles. The solids wt% is calculated using the following formula:

Solids wt. %=Dried Polymer Wt./Emulsion Wt. (before drying)×100%

Viscosity was measured with a Brookfield Viscometer DV-11 (Brookfield Instrument Company, Middleboro, Mass.), #3 Spindle @ 50rpm @ 20° C. The sample is equilibrated to approximately 20° C. The instrument is properly auto zeroed according to manufacturers' instructions. A minimum of a quart sample is used to minimize side wall effects. The spindle is lowered into the sample up to the calibrated mark. The spindle is turned on at the appropriate speed and the instrument is allowed to equilibrate before recording the viscosity measurement in cps.

Example 1

(Control): No Mercaptopropionic Acid and 20% Acrylic Acid

An initial charge of 400 g of water was placed into a 5 liter flask equipped with a stirrer, thermometer, condenser and $N_2$ bubbler, followed by heating the kettle water to 61-63° C. with agitation and a nitrogen purge. Separately, each of the following solutions was prepared:
1. 800 grams butyl acrylate, 200 grams acrylic acid, 45 grams n-dodecylmercaptan (monomer component);
2. 360 grams aqueous/surfactant mix comprising of 2.78 percent sodium lauryl sulfate (surfactant) and the balance water.
3. 2.98 g of ammonium persulfate (APS) in 95 grams of water; and,
4. 2.98 g of sodium bisulfite (NaBS) in 95 grams of water.

Once the kettle water reached the desired temperature, 1 gram of acetic acid was added, followed by 1.6 grams of a 1% ferrous sulfate solution. Separate co-feeds of the ammonium persulfate (APS) and sodium bisulfite (NaBS) solutions into the flask were started at a rate of 0.5 gram/min. After 5 mins, the monomer component feed and surfactant feeds were started simultaneously, passing through an in-line emulsification unit. The emulsified effluent continued into the 5 liter flask. Both the monomer component and surfactant feeds were fed consistently over 3 hours. The APS and NaBS feeds were carried out over 3 hours and 20 mins.

After completing the copolymerization, the feed pumps and lines were rinsed with 85 grams of water. Then, the temperature was maintained while feeding over 30 mins each of two separate solutions of 2.2 grams of (70%) tert-butyl hydroperoxide in 15 grams of water and 1.1 grams of isoascorbic acid in 15 grams of water.
Once these feeds had completed, the copolymerization product was cooled to 35 to 40° C. and filtered. The physical measurements on the filtered dispersion gave a range of: pH=1.7-2.1, Solids=49-51%, PS=190-320 nm.

Example 2

0.5% BOM (Based on Monomer) of Mercaptopropionic acid (3-MPA) and 20% Acrylic Acid The procedure of Example 1 was repeated, except that:
A. Separately, each of the following solutions was prepared:
1. 800 grams butyl acrylate, 200 grams acrylic acid, 45 grams n-dodecylmercaptan and 5 grams mercaptopropionic acid (monomer and mixed chain transfer agent components).
2. 360 gram aqueous/surfactant mix comprising of 2.78 percent sodium lauryl sulfate (surfactant) and the balance water.
3. 2.98 g of ammonium persulfate (APS) in 95 grams of water; and,
4. 2.98 g of sodium bisulfite (NaBS) in 95 grams of water.

B. The monomer and mixed chain transfer agent component feed and surfactant component feed were mixed together, passing through an in-line emulsification unit just prior to entering the 5 liter flask.

Once the feeds were complete, the copolymerization product was cooled to 35 to 40° C. and filtered. The physical measurements on the filtered dispersion have a range of: pH=1.7-2.1, Solids=49-51%, PS=190-320 nm.

Example 3

(Control): No Mercaptopropionic Acid and 40% Acrylic Acid

The procedure of Example 1 was repeated, except that:
A. Separately, each of the following solutions was prepared:
1. 600 grams butyl acrylate, 400 grams acrylic acid, 45 grams n-dodecylmercaptan.
2. 360 gram aqueous/surfactant mix comprising of 2.78 percent sodium lauryl sulfate (surfactant) and the balance water.
3. 2.98 g of ammonium persulfate (APS) in 95 grams of water; and,
4. 2.98 g of sodium bisulfite (NaBS) in 95 grams of water.

B. The monomer and mixed chain transfer agent component feed and surfactant component feed were mixed together, passing through an in-line emulsification unit just prior to entering the 5 liter flask.
Once the feeds were complete, the copolymerization product was cooled to 35 to 40° C. and filtered. The physical measurements on the filtered dispersion have a range of: pH=1.7-2.1, Solids=49-51%, PS=190-320 nm.

Example 4

0.5% BOM (Based on Monomer) of 3-MPA and 40% Acrylic Acid

The procedure of Example 1 was repeated, except that:
A. Separately, each of the following solutions was prepared:
1. 600 grams butyl acrylate, 400 grams acrylic acid, 45 grams n-dodecylmercaptan and 5 grams mercaptopropionic acid (monomer and mixed chain transfer agent components).
2. 360 gram aqueous/surfactant mix comprising of 2.78 percent sodium lauryl sulfate (surfactant) and the balance water.
3. 2.98g ammonium persulfate (APS) in 95 grams of water
4. 2.98g of sodium bisulfite (NaBS) in 95 grams of water.

B. The monomer and mixed chain transfer agent component feed and surfactant component feed were mixed together, passing through an in-line emulsification unit just prior to entering the 5 liter flask.
Once the feeds were complete, the copolymerization product was cooled to 35 to 40° C. and filtered. The physical measurements on the filtered dispersion have a range of: pH=1.7-2.1, Solids=49-51%, PS=190-320 nm.

TABLE 1

Composition and Viscosity Data

| EXAMPLE | BA/AA/nDDM | 3-MPA | PS, nm | pH | Solids, W % | Viscosity, cps |
|---|---|---|---|---|---|---|
| 1 | 80/20/4.5 | — | 225 | 2.05 | 49.8 | 1420 |
| 2 | 80/20/4.5 | 0.5 | 248 | 1.84 | 49.9 | 162 |
| 3 | 60/40/4.5 | — | 316 | 1.74 | 50.5 | 9060 |
| 4 | 60/40/4.5 | 0.5 | 191 | 1.80 | 49.3 | 1010 |

As shown in Examples 1-4 in Table 1, a dramatic final polymer product viscosity reduction results when the 3-MPA is added to the reaction mixture. There is almost a ten-fold reduction of viscosity in both sets when 0.5% 3-MPA is added, showing that easy to handle high solids compositions can be obtained. Example 3 had the largest viscosity measurement taken in any of the Examples 1-4 because of the amount and Mw of aqueous phase acid. In Example 3, the observed mixing vortex nearly stalled or collapsed.

TABLE 2

Aqueous Phase Analysis

| EXAMPLE | BA/AA/nDDM | 3-MPA | Mw, ×1000 | % of charged AA in aqueous phase |
|---|---|---|---|---|
| 1 | 80/20/4.5 | — | 35.2 | 42.5 |
| 2 | 80/20/4.5 | 0.5 | 14.9 | 48.1 |
| 3 | 60/40/4.5 | — | 121.3 | 62.4 |
| 4 | 60/40/4.5 | 0.5 | 31.0 | 66.6 |

The aqueous and dispersed polymer phases of each Example emulsion was separated using a centrifuge (100,000 rpm, 60 min @ 5° C.). The aqueous phase was decanted from the tube separating the liquid from the dispersed solid polymer. Table 2, above, lists the percentage of total "charged" acid (M=acrylic acid), and the Mw (molecular weight) of the water soluble polymer in the separated aqueous fraction.

The aqueous acid was determined by standard titration techniques. Mw was determined by aqueous GPC calibrated with polyacrylic acid standards. The viscosity reduction observed in Examples 2 and 4 is believed to be directly related to a reduction of the water soluble polymer molecular weight.

We claim:

1. An aqueous amphiphilic emulsion copolymer composition comprising aqueous liquid and one or more aqueous amphiphilic emulsion copolymer, the aqueous amphiphilic emulsion copolymer comprising residues of one or more hydrophilic chain transfer agent, and residues of one or more hydrophobic chain transfer agent, the aqueous amphiphilic emulsion copolymer comprising the reaction product of a monomer component of (i) from 20 to 80 wt. % of one or more hydrophilic group-containing monomer chosen from ethylenically unsaturated carboxylic acid, (meth)acrylamide, amine-functional (meth)acrylates, hydroxyalkyl (meth)acrylate, phosphorus-containing acid functional (meth)acrylate, (poly)alkoxylated (meth)acrylate, sulfonic acid functional (meth)acrylate, (meth)acrylamide methylpropane sulfonate, alkyl vinyl ether, vinyl phosphonate, vinyl sulfonate, vinyl pyrrolidone, vinyl caprolactam, vinyl amine and vinylimidazole, and (ii) from greater than 20 to 80 wt.% of one or more copolymerizable ethylenically unsaturated monomer chosen from $C_3$ to $C_7$ (cyclo)alkyl (meth)acrylate, $C_8$ to $C_{30}$ (cyclo) alkyl (meth)acrylate, vinyl ester, vinyl group containing olefin prepolymer, monoalkyl (meth)acrylamide, N,N-dialkyl (meth)acrylamide, styrene, and a-methyl styrene, wherein, when the copolymerizable ethylenically unsaturated monomer is $C_8$ to $C_{30}$ alkyl (meth)acrylate, the proportion of such monomer ranges from greater than 50 wt. % up to and including 80 wt. %, further, wherein, when the copolymerizable ethylenically unsaturated monomer is cycloalkyl (meth)acrylate, the proportion of the one or more hydrophilic group-containing monomer is 25 wt. m % or more, all monomer percentages based on the total weight of the monomer component, still further, wherein the hydrophilic chain transfer agents are chosen from alkyl mercaptocarboxylic acids, aryl mercaptocarboxylic acids, methyl mercaptan, ethyl mercaptan, n-butyl mercaptan, t-butyl mercaptan, mercaptoacetic acid, mercaptopropionic acids, mercaptoethanol, mercaptopropanol, mercaptobutanol, 3-mercaptol-1,2-propanediol, 2- methyl-2-propanethiol, 1-thioglycerol, methyl 3-mercaptopropionate (MMP), thioglycolic acid, thiomalic acid, thiomalonic acid, thioadipic acid, 2-mercaptoethanesulfonic acid, bromoform, chloroform, lower oxoacids, salts of lower oxoacids, hypo phosphorous acids, salts of hypophosphorous acids, sulfurous acid, hydrogen sulfite, dithionous acid, metabisulfurous acids, salts of metabisulfurous acids, and mixtures thereof;

yet still further, wherein the hydrophobic chain transfer agents are chosen from n-dodecyl mercaptan (n-DDM), t-dodecyl mercaptan (dodecanethiol), decyl mercaptan, octyl mercaptans, benzyl mercaptan, phenyl mercaptan, cyclohexyl mercaptan, pentaerythritol tetramercaptopropionate, hexadecyl mercaptan, octyldecyl mercaptan, tetradecyl mercaptan, n-butyl 3-mercaptopropionate (BMP) and 2-ethylhexyl-3-mercaptopropionate; tetrachlorocarbons, tetrabromocarbons, methylene chloride, bromotrichloroethane, and mixtures thereof; and, yet even still further wherein the total amount of chain transfer agent is 3.0 wt. % or more, based on the total weight of a reaction mixture that is the total of aqueous liquid, monomers, chain transfer agents, surfactants, and initiators used to make the copolymer composition.

2. The composition as claimed in claim 1, wherein the hydrophilic group-containing monomer is acrylic acid.

3. The composition as claimed in claim 1, wherein the copolymerizable ethylenically unsaturated monomer is chosen from butyl acrylate, ethylhexyl (meth)acrylate, lauryl (meth)acrylate, isobornyl (meth)acrylate, cetyleicosyl methacrylate, styrene, a-methyl styrene, and mixtures thereof.

4. The composition as claimed in claim 1, further comprising one or more macromolecular organic compound having a hydrophobic cavity.

5. The composition as claimed in claim 1, wherein the amount of hydrophilic chain transfer agent is from 0.05 to 1.75 wt. %, based on the total weight of the reaction mixture.

6. The composition as claimed in claim 1 comprising a distribution of copolymers having a gradient hydrophilic group concentration.

7. A method for making an aqueous amphiphilic emulsion copolymer composition comprising an emulsion copolymer containing residues of one or more hydrophilic chain transfer agent, and residues of one or more hydrophobic chain transfer agent, the method comprising, providing an aqueous liquid, providing a monomer component of (i) from 20 to 80 wt. % of one or more hydrophilic group-containing monomer chosen from ethylenically unsaturated carboxylic acid, (meth)acrylamide, amine-functional (meth)acrylates, hydroxyalkyl (meth)acrylate, phosphorus-containing acid functional (meth)acrylate, (poly)alkoxylated (meth)acrylate, sulfonic acid functional (meth)acrylate, (meth)acrylamide methylpropane sulfonate, alkyl vinyl ether, vinyl phosphonate, vinyl sulfonate, vinyl pyrrolidone, vinyl caprolactam, vinyl amine and vinylimidazole, and (ii) from greater than 20 to 80 wt. % of one or more copolymerizable ethylenically unsaturated monomer chosen from $C_3$ to $C_7$ (cyclo)alkyl (meth)acrylate, $C_8$ to $C_{30}$ (cyclo)alkyl (meth)acrylate, vinyl ester, vinyl group containing olefin prepolymer, monoalkyl (meth) acrylamide, N,N-dialkyl (meth)acrylamide, styrene, and α-methyl styrene, wherein, when the one or more copolymerizable ethylenically unsaturated monomer comprises a $C_8$ to $C_{30}$ alkyl (meth)acrylate, the proportion of such monomer ranges from greater than 50 wt. % up to and including 80 wt. %, and, further wherein, when the copolymerizable ethylenically unsaturated monomer is cycloalkyl (meth)acrylate, the proportion of the said one or more hydrophilic group-containing monomer is 25 wt. % or more, all monomer percentages based on the total weight of the monomer component;

providing a mixed chain transfer agent component which comprises one or more hydrophobic chain transfer agent and one or more hydrophilic chain transfer agent, providing a catalyst or initiator component, providing a surfactant or emulsifier component, combining the components to form a reaction mixture whereby the catalyst or initiator component and the said hydrophilic chain transfer agent do not contact each other until copolymerization begins, wherein the total amount of chain transfer agent is 3.0 wt. % or more, based on the total weight of the reaction mixture, and aqueous emulsion copolymerizing the reaction mixture to form one or more aqueous phase copolymer and one or more disperse phase copolymer, wherein the hydrophilic chain transfer agents are chosen from alkyl mercaptocarboxylic acids, aryl mercaptocarboxylic acids, methyl mercaptan, ethyl mercaptan, n-butyl mercaptan, t-butyl mercaptan, mercaptoacetic acid, mercaptopropionic acids, mercaptoethanol, mercaptopropanol, mercaptobutanol, 3-mercaptol-1 ,2-propanediol, 2- methyl-2-propanethiol, 1-thioglycerol, methyl 3-mercaptopropionate (MMP), thioglycolic acid, thiomalic acid, thiomalonic acid, thioadipic acid, 2-mercaptoethanesulfonic acid, bromoform, chloroform, lower oxoacids, salts of lower oxoacids, hypo phosphorous acids, salts of hypo phosphorous acids, sulfurous acid, hydrogen sulfite, dithionous acid, metabisulfurous acids, salts of metabisulfurous acids, and mixtures thereof; and, further, wherein the hydrophobic chain transfer agents are chosen from n-dodecyl mercaptan (n-DDM), t-dodecyl mercaptan (dodecanethiol), decyl mercaptan, octyl mercaptans, benzyl mercaptan, phenyl mercaptan, cyclohexyl mercaptan, pentaervthritol tetramercaptopropionate, hexadecyl mercaptan, octyldecyl mercaptan, tetradecyl mercaptan, n-butyl 3-mercaptopropionate (BMP) and 2-ethylhexyl-3-mercaptopropionate; tetrachlorocarbons, tetrabromocarbons, methylene chloride, bromotrichloroethane, and mixtures thereof.

8. The method as claimed in claim 7, wherein the copolymerizable ethylenically unsaturated monomer is complexed with one or more macromolecular organic compound having a hydrophobic cavity.

9. The method as claimed in claim 7, wherein the hydrophilic chain transfer agent is mercaptopropionic acid.

10. The aqueous emulsion copolymer composition as claimed in claim 1, wherein the emulsion copolymer has a weight average molecular weight of from 2,000 to 200,000.

11. The method as claimed in claim 7, wherein the reaction mixture comprises less than 5 wt. % of any organic solvent, based on the total weight of water and solvent.

* * * * *